Dec. 4, 1962 — M. H. KELLY — 3,066,889
VTOL AIRCRAFT

Filed Aug. 22, 1960 — 5 Sheets-Sheet 1

*INVENTOR.*
MERRILL H. KELLY
BY
Agent

Dec. 4, 1962
M. H. KELLY
3,066,889
VTOL AIRCRAFT
Filed Aug. 22, 1960
5 Sheets-Sheet 2
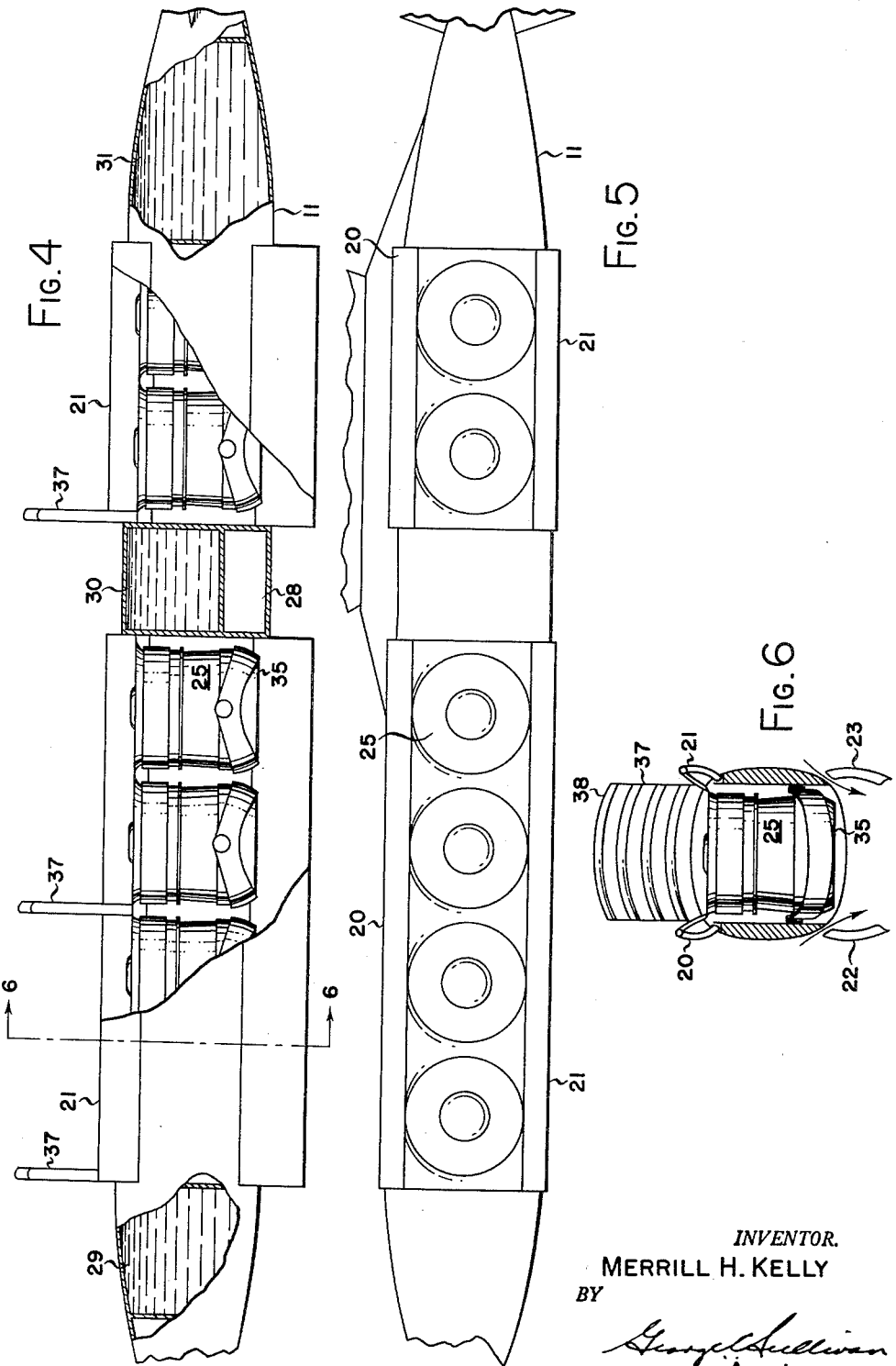
INVENTOR.
MERRILL H. KELLY
BY
Agent INVENTOR.
MERRILL H. KELLY
BY
Agent

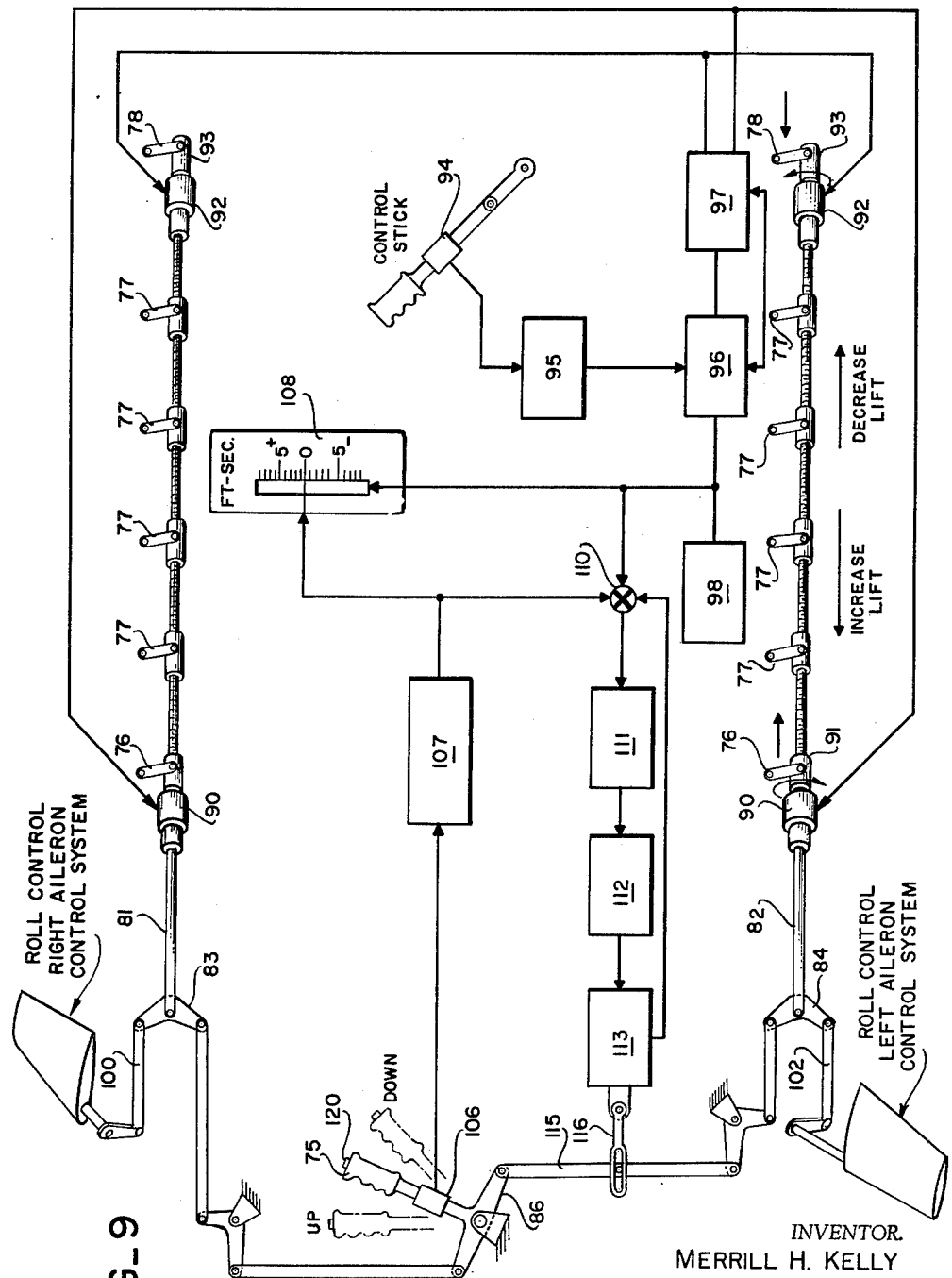

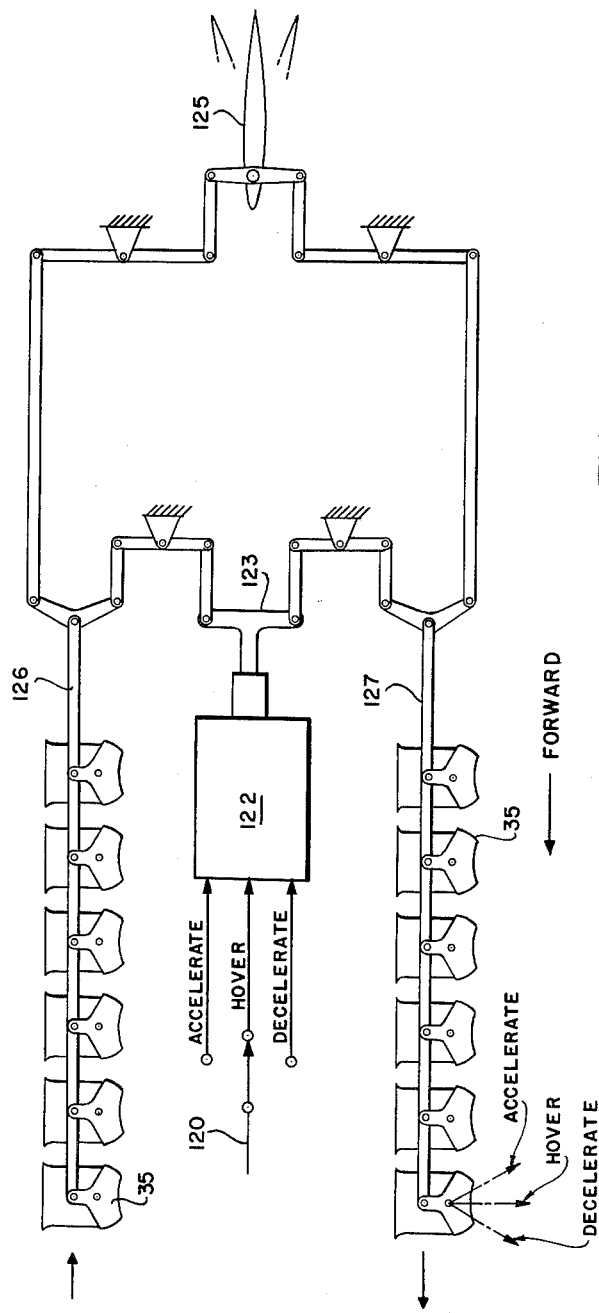

United States Patent Office 3,066,889
Patented Dec. 4, 1962

3,066,889
VTOL AIRCRAFT
Merrill H. Kelly, Northridge, Calif., assignor to Lockheed Aircraft Corporation, Burbank, Calif.
Filed Aug. 22, 1960, Ser. No. 50,987
4 Claims. (Cl. 244—12)

This invention pertains to an aircraft adapted for vertical and short takeoff and landing.

Modern warfare with the possibility of a surprise attack capable of eliminating vital major installations with one blow makes the concept of dispersed retaliatory capacity essential. The long runways and logistic support required by modern fighter and bomber airplanes are difficult to conceal, particularly when a country is close to a potential enemy. An aircraft is needed which can take off and land vertically on unprepared dispersed small area sites with a minimum of logistic support while having the performance and mission capability to deliver a major retaliatory attack.

One of the prior ways of providing VTOL/STOL capability involved main engines on rotating mounts, remotely coupled lift fans and small lift engines. Conceivably, large turbojet engines could be installed on mounts permitting rotation to a vertical position for takeoff. In level flight they would be stowed horizontally for minimum drag. A disadvantage to such arrangement is the need for locating these engines close to the airplane center of gravity. The divergence of air at the ground created a negative pressure under the wings of the aircraft tending to make it "stick" to the ground. Otherwise the variation of thrust moment about the center of gravity would impose severe requirements on the control system. This arrangement would obviously dominate the airplane configuration. With so much excess thrust available, a degradation in cruise specific fuel consumption would result unless half the engines were shut down. In addition, a substantial weight penalty would be incurred by the engine rotating mechanism, complicated inlet ducts and closure doors.

A second VTOL/STOL aircraft would redirect main engine exhaust gasses in some fashion through vertically oriented jet augmenters. Such devices can provide thrust approximately fifty percent (50%) above engine rated thrust by inducing secondary air flow. If satisfactory at takeoff, this ararngement would again result in an overpowered airplane for the remaining portions of the mission. In configuration studied to date, the weight and volume of these installations have generally been detrimental.

A third possible VTOL/STOL propulsion system employs lifting fans driven by the main engine through diversion of the exhaust gasses or mechanical coupling. The main virtue of this scheme is that the main engine thrust can be quite closely matched to all phases of flight. While showing some merit for subsonic aircraft, this principle affects the configuration to such an extent as to be inapplicable to a supersonic design. The fans can be mounted in the fuselage only with a considerable loss in fuel volume and fit with difficulty in even moderately thin wings properly sized for the cruise condition.

It is an object of the present invention to provide an aircraft capable of vertical or short takeoff and landing which has the performance and mission capability of a conventional aircraft. VTOL capability is provided for a conventional aircraft by the addition of wing-tip pods containing lift engines. Small turbojet or turbofan engines are mounted upright in line in the pod to permit a design of minimum frontal area and minimum drag penalty. The minimum drag penalty permits the attaining of usual conventional aircraft performance capability between takeoff and landing.

It is another object of this invention to provide an aircraft utilizing vertically oriented lift engines which do not interfere with fuel carrying capacity or aerodynamic control surfaces. The lift engines carried in wing-tip pods as compared to lift engines in the wing surfaces or the fuselage do not interfere with the main propulsion devices or fuel carrying capacity.

It is another object of this invention to provide a VTOL/STOL aircraft utilizing vertically oriented lift engines located in such a manner that negative pressures under the aircraft from divergence of air from the lift engines are neutralized. The lift engines are located in pods at the wing-tips so that pressure under the wing plan form is raised to approximately that of the ambient air so as to minimize ground "sticking."

It is another object of the present invention to provide a vertical takeoff aircraft which invention is adapted to the conversion of conventional aircraft for VTOL operation. Wing-tip pods having vertically oriented lift engines may be attached or removed so that the aircraft may have VTOL capability or operate in the normal manner.

It is another object of this invention to provide a vertical takeoff aircraft which permits the use of conventional aircraft controls. The conventional controls are connected to the lift engines, their nozzles and pitch control vanes in the exhaust so that steering control remains in the pilot's control stick. Pitch control at zero speed is provided by a vane in the exhaust of the main turbojet engine, which control is connected directly to the elevator controls. Roll control is provided by connecting the aileron connection to the control stick to the throttles of the small lift engines in the pods. Yaw control is provided by connecting the rudder pedals to movable nozzles of the exhausts of the vertically oriented lift engines in the wing-tip pods.

Further objects and advantages of the present invention will become apparent from the reading of the following specification taken in conjunction with the appendant drawings wherein like numerals indicate like elements.

FIGURE 4 is a view taken on lines 4—4 of FIGURE 3 with parts broken away.

FIGURE 5 is a view taken on lines 5—5 of FIGURE 3.

FIGURE 6 is a view taken on lines 6—6 of FIGURE 4 showing in detail cascades for diversion of intake air to the lift engines during the transition to or from forward flight.

FIGURE 9 is a schematic of the throttle control system for the lift engines.

FIGURE 10 is a schematic of the lift engine nozzle directing system.

Figure 1:
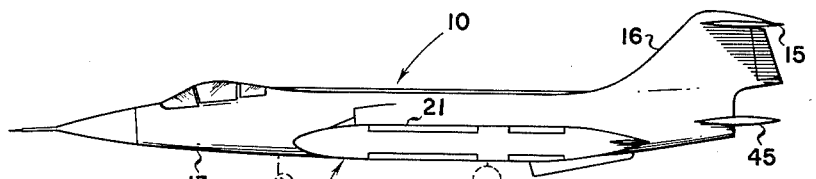
FIGURE 1 is a side view of the aircraft according to the present invention.
Figure 2:
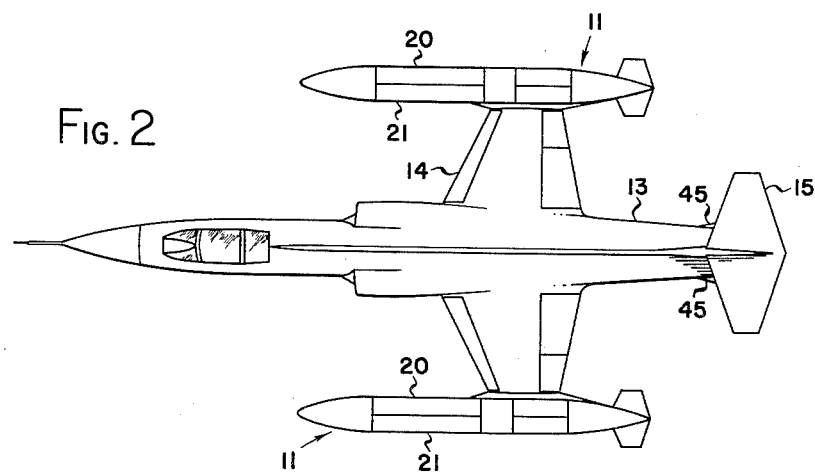
FIGURE 2 is a plan view of the aircraft.
Figure 3:
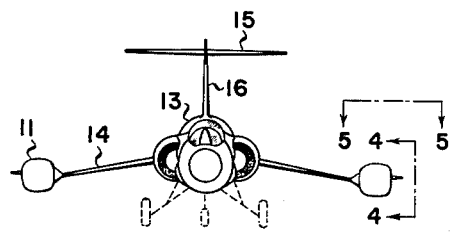
FIGURE 3 is a front view of the aircraft.

FIGURE 1 shows the VTOL/STOL aircraft 10 with pods 11, a conventional fuselage 13 in which there is a turbojet engine for normal horizontal flight, wings 14, a horizontal stabilizer 15 and a vertical stabilizer 16. During normal horizontal flight the doors 20, 21, 22 and 23 of lift engine pod 11 are closed to a smooth aerodynamic shape as shown to provide minimum drag. During normal flight, the lift engines will be secured and used only for takeoffs and landings and/or emergency operations.

Note that each pod 11 is shown carrying six turbofan engines 25. They are spaced in such a manner along the pod so that their lift will be centered at approximately the center of gravity of the aircraft. An area 28 between the fourth and fifth engines from the front provides a space for a control bay for the engines 25. A fuel tank 29 is placed in the front of pod 11, fuel tank 30 between the fourth and fifth engines, and fuel tank 31 aft of the pod 11 to provide sufficient fuel for takeoff and landing for a normal mission, thus not affecting the normal fuel capacity of the aircraft.

The lift engines may be turbojet or turbofan engines. However, the turbofan engine offers significant advantages in specific fuel consumption as well as a lowering of exhaust gas temperature and pressure which is important from the viewpoint of the demands upon the site from which the aircraft is to operate. The turbojet engine offers a better thrust-to-weight ratio and is simpler than the turbofan engine. Thus, either may be used but the turbofan engine is used here for descriptive purposes.

Location of the lift engines 25 at the wing-tips minimize control in the vicinity of the ground. As air from the lift engine exhausts is thrust down against the ground, it is turned outwardly. Under a large plan form area this would create a negative pressure tending to make the aircraft stick to the ground. Thrust from the lift engines would have to be great enough to overcome the weight of the aircraft and the sticking effect. By spacing the lift engines at the periphery of the wing plan form, the air is contained and pressure retained. By spacing engines substantially around all of the periphery of the wing, positive pressure would result giving some additional lift. However, this is not desirable since the center of gravity is located at the forward part of the wing area in an aircraft adapted for conventional flight. Lift from positive pressure near the ground at near zero forward speed would tend to pitch the aircraft down resulting in difficult control problems. Thus it is desirable to locate the lift engines so that pressures under the wings are neutral with respect to atmospheric or ambient pressures. Location of lift engines 25 at the wing-tips provides sufficient spillage of air from under the wing, yet maintains it high enough to prevent sticking.

As can be seen from FIGURES 4, 5, and 6, the doors 20, 21, 22 and 23 are opened to provide for vertical operation of the aircraft. Engine inlet air for the lift engines is drawn between the upper inlet doors 20 and 21, hinged at the sides of the pod 11, and folded to provide a bell-mouth cross sectional shape as can be seen in FIGURE 6. Folding also serves to reduce operating engine moments. The lower doors 22 and 23, by means of an offset hinge line, provide a gap through which secondary air flow is drawn cooling the door surfaces and providing augmented thrust. Both sets of doors are simultaneously operated by mechanical linkage and driven by dual actuators. Each engine 25 is provided with a swivelling nozzle 35 which can be rotated 15° fore or aft. Each nozzle in each pod is linked together by linkage not shown here so that all nozzles in a pod operate together as a unit for purposes to be described below.

During normal vertical operation, air flow to the lift engines 25 will be normal to their inlets; however, during transition either from vertical takeoff to horizontal flight or horizontal flight to vertical landing, there will be forward motion and cross flow of engine inlet air which may produce unacceptable thrust losses. To alleviate this condition, retractable air cascades 37 are provided. These cascades 37 have vanes 38 which turn the air downward into the inlets of the lift engines 25. Cascades 37 are located in front of the first, third, and fifth lift engines 25 and are retracted prior to the closing of the pod doors 20 through 23 from their upper position as shown in FIGURES 4 and 6.

Figure 7:
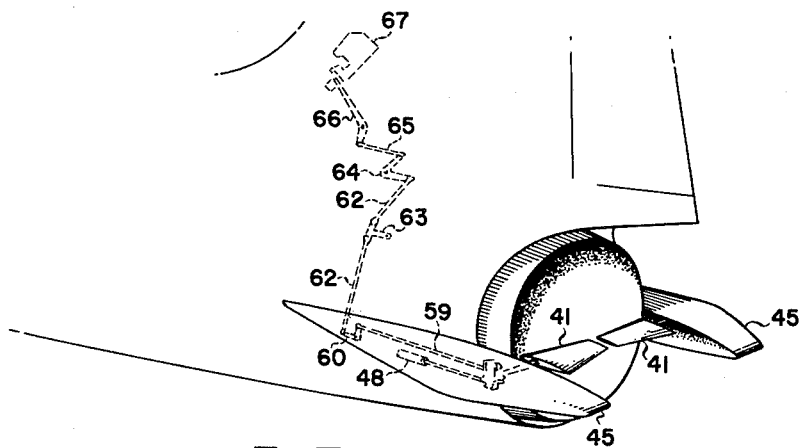
FIGURE 7 shows the pitch control vanes in the exhaust of the main engine of the aircraft.
Figure 8:
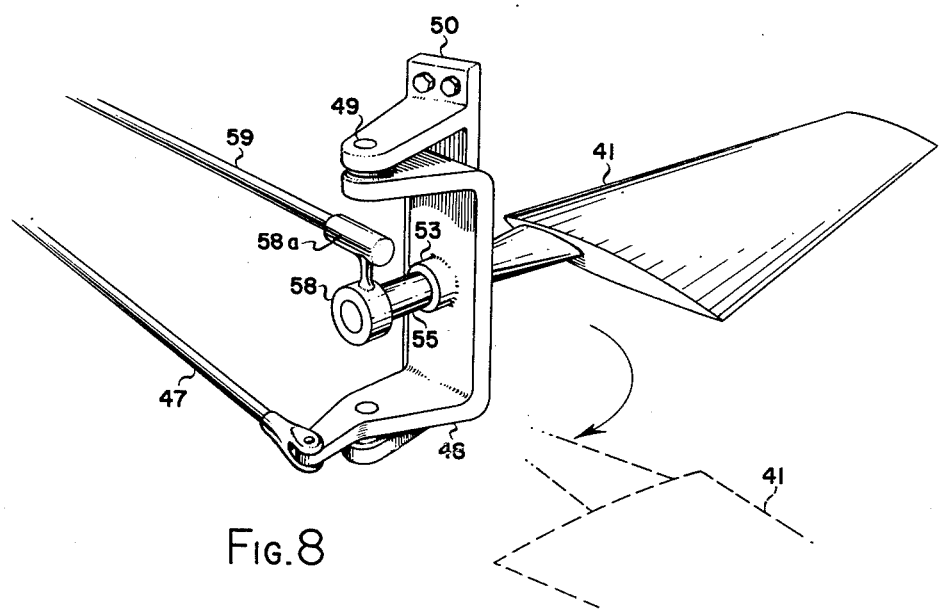
FIGURE 8 is the detail of the pitch control vanes operating mechanism.

The main turbojet engine in fuselage 13 provides pitch control forces during vertical takeoffs and landings by means of vanes 41 in the jet exhaust as shown in FIGURES 7 and 8. During normal flight, the vanes 41 will be retracted into the fairings 45 so that they are out of the exhaust stream. When vertical flight is desired, the vanes 41 are moved from the faired position in the fairings 45 to that shown in FIGURE 7 or that shown in the full line position in FIGURE 8 by movement of the push rod 47 operated by a piston-cylinder combination 48 powered from the aircraft's hydraulic system or bleed air from the main engine. Push rod 47 rotates U-shaped member 48 about pivot axis 49 in the bracket 50 fixed to the aircraft structure. The U-shaped member 48 carries a bearing 53 in which the shaft 55 fixed to vane 41 can be rotated. Fixed to the outer end of shaft 55 is an arm 58 on top of which is a conventional ball slip joint 58a connecting it to push rod 59 and the aircraft's elevator controls connected to the cockpit control stick. As can be seen from FIGURE 7, the arm 59 is operated through a bell crank 60, push rods 61 and 62 linked around the main jet engine by idler 63, bell crank 64, push rod 65, and another bell crank 66 to the elevator control mechanism 67. Thus, fore and aft movement of the pilot's control stick will cause the vanes 41 in the exhaust stream of the main jet engine to exert the usual pitch control forces to the aircraft. Although a push rod pitch control system is shown, a cable system is also possible. Operation of the existing control stick operates the vanes 41 as well as the elevator. In a stowed position, the vanes 41 are automatically disconnected from the control stick by means of the ball slip joint 58a so that during normal flight no movement will be imparted to them by operation of the elevator controls.

Alternate pitch control means during vertical takeoffs and landings may involve modulating thrust reverser in the jet exhaust. Such a device would provide the required pitching moments without any forward thrust component. Another means would use bleed air from the main propulsive engine jetted vertically at the fore and aft ends of the aircraft.

Pitch trim may be effected by differential operation of the throttle of lift engines 25. Any increase in thrust necessary to maintain constant total lifting force may be spread equally over the other several engines. It can be shown that the most economical way of effecting trim control is by reducing the thrust of the most forward or aft engine in each pod and simultaneously equally raising the thrust in all of the remaining engines. The total pitch control required is the sum of capabilities required for longitudinal trim and maneuvering. The need for pitch trim control arises primarily from the fact that the center of gravity of the airplane moves aft during flight, fuel consumption being the major contributing factor. Maneuvering control is supplied by the two movable vanes 41 which are used only during certain phases of VTOL operation.

Roll control is achieved by increasing the lift of all engines 25 in one pod 11 at the same time as the lift of all engines in opposite pod 11 is decreased. This results in a pure rolling moment with no unbalanced vertical forces to cause vertical acceleration and displacement of the aircraft. Roll control during vertical takeoff and landing is achieved by a connection between the aileron control and the throttles of the lift engines 25 so that lateral movement of the pilot's control stick will accomplish roll in the normal manner.

For yaw control, lift engine nozzles 35 are swivelled differentially by operation of the rudder pedals in the conventional control system. A cable system not shown here connects the rudder pedals and the nozzles 35. With nozzles in the hover or neutral position, yaw control is obtained by rotating the nozzles forward on all lift engines of one pod 11 while simultaneously rotating the nozzles 35 aft on all the lift engines 25 of the opposite pod 11. This results in minimum nozzle movement as well as a pure yawing moment.

The only additional control necessary for vertical operation is that to control the throttles of the lift engines 25. A vertical flight control lever placed in the cockpit is provided. It commands altitude rate by modulating engine thrust. The vertical flight control lever is similar to the collective pitch lever in the helicopter as it controls vertical velocity. By using a servo system to sense altitude, the pilot may hold a particular altitude or design vertical velocity in feet per second. This function is accomplished by means of a simultaneous increase or decrease in the thrust of all lift engines in the aircraft. Except for the vertical flight control lever which moves up and down, the controls for vertical flight are the same as those for horizontal flight which simplifies pilot procedures.

Automatic stability control for the pitch, yaw and roll during vertical operations are tied to the automatic pilot system as are the normal pitch, yaw and roll controls. It is recognized that vertical operations will be very difficult even for the experienced pilot. However, by utilizing a conventional aircraft design with lift pods on the wing-tips, the same autopilot mechanism used for normal flight may be used to control and stabilize the aircraft during vertical operations, thus simplifying the aircraft as well as keeping the weight at a minimum. The only additional automatic stability system required would be that for the vertical control system. This automatic vertical control system would require only those servo devices necessary to sense altitude and establish a vertical rate. Present day autopilots are highly reliable, thus it can be seen that by using the present day autopilot in conventional aircraft having lift engines in wing-tip pods, a very successful VTOL aircraft is possible.

FIGURE 9 shows the lift engine throttle control system which includes vertical rate control, roll control and pitch trim control. For purposes of simplification, the linkage between the control stick and the aileron control system is not shown. It will be understood that it is the conventional linkage which may be either of the mechanical or servo systems. It is necessary, however, to show the ailerons and the linkage which will be connected from the aileron control system to the lift engine throttles.

The mechanisms which produce pitch, yaw and roll are directly linked to their aerodynamic counterparts. The control stick and rudder pedals produce the same motions. The one motion not experienced in a conventional airplane, vertical ascent or descent, must be controlled by an added lever. This lift lever 75 corresponds to the collective pitch control stick in a helicopter. The throttle levers 76 through 78 are shown connected to linear push rods 81 and 82 which in turn are connected to bell crank levers 83 and 84 and through similar linkage to the lift lever 75. When the ailerons are stationary, that is the control stick is not being moved, and the lift lever 75 is moved to its up position, the bell crank 86 would cause the linkages to move in such a manner as to move the rods 81 and 82 forward thereby increasing the thrust output of the lift engines by opening their throttles. Conversely when the lift lever 75 is moved to its down position the rods 81 and 82 will be moved toward the right which will decrease the throttle opening and the vertical lift. Mounted on the rods 81 and 82 to move therewith are pitch trim motors 90 and 92. Pitch trim motor 90 moves the actuator rod 91 linearly to actuate the forward engine throttle levers 76 independently. Pitch trim motors 92 move the aft lift engine levers 78 independently through rods 93.

The control mechanism includes a control stick to which is operatively connected a force sensor 94 which sends electrical signals to the pitch control computer 95. The signal from the pitch control computer 95 is fed to the altitude control computer 96 and thence to the automatic pitch control computer 97. Air data computer 98 senses air speed and altitude and feeds electrical signals corresponding to same to the altitude control computer 96.

The automatic control computer 97 integrates the signals from the altitude control computer 96. For nose down pitch trim the motors 90 will be caused to shorten the linear actuator rod 91 and the motor 92 to lengthen rods 93 to decrease lift on the forward lift engines and increase lift on the aft engines. For nose up pitch trim the opposite would be effected.

The aileron control linkages are connected directly to the lift engine throttle levers. When right roll is desired the right aileron will rotate up or counterclockwise and the left will rotate down or clockwise as seen in FIGURE 9 to produce a right wing down condition. The rod 100 would be moved toward the right through rod 81 to move the lift engine levers 76–78 on the right to decrease the thrust on the lift engines on the right wing. At the same time, the left aileron moving in a clockwise sense will cause the rod 102 to move forward and along with it the rod 82 to increase the throttle opening on the engines in the left pod so as to increase lift in that pod causing right roll. The opposite would occur when a left roll was desired.

Since vertical altitude is very sensitive in a VTOL airplane, it becomes necessary to provide an automatic means to provide additional fine control for steady altitudes or rates of vertical acceleration. To facilitate this control a force sensor 106 fixed to lift lever 75 will cause a vertical acceleration signal to be fed to integrator 107. From the integrator 107 comes a vertical rate signal which is fed to a vertical rate display and summing point 110. A signal from air data computer 98 is also fed to the summing point 110. The signal at the summing point 110 is amplified by amplifier 111 which controls a transfer valve 112 and an altitude rate control actuator 113. The altitude rate control actuator produces a signal which is fed back into the summing point 110. Altitude variations will cause the actuator 113 to move the lever 116 up and down to change throttle settings on the engines on either side of the aircraft simultaneously to maintain a steady altitude or vertical acceleration rate.

FIGURE 10 shows the nozzle directing means and their connections with the rudder control system. On the lift lever 75 there is a three position lift engine nozzle selector switch 120. The three positions selectable by switch 120 are accelerate, hover and decelerate. This switch controls a linear actuator 122 which moves the T shaped member 123 fore or aft to simultaneously move the nozzles of all of the lift engines to any of the three selected positions. Note that the decelerate position points the nozzle slightly forward while accelerate points it aft and hover is substantially vertical.

Rudder 125 which will be operated by the rudder pedals in the cockpit through conventional linkages not shown. A bell crank and push rod system connected through the nozzle control rods 126 and 127 will direct the nozzles in relation to rudder position. If the left rudder is desired which is the equivalent of a left turn or a left yaw, the nozzles on the left side of the aircraft will be pointed forwardly to push the left side back and the nozzles on the right side pushed aft to push the right side forward. The linkage from the control horn on rudder 125 will cause the rod 127 to move aft and the rod 126 to move forward directing the nozzles 35 of the vertically oriented lift engines appropriately. Note that the control movement from the linear actuator 122 and that from the rudder control system is integrated so that the nozzles 35 have a plurality of positions.

In operation, the main engine is started from ground power in the usual manner. Bleed air from the main engine compressor is then ducted to the lift engines and impinged upon the turbine of the lift engines to start them. When all lift engines 25 are operating satisfactorily, vertical liftoff can be initiated. The main engine is operated at a sufficient thrust level for effective operation of the pitch maneuvering control vanes 41 in the exhaust. Concurrent with liftoff, the aircraft nose is raised approximately 10° by use of the vanes 41 in the exhaust and/or by increasing the thrust of those engines 25 located forward of the aircraft center of gravity. Lift engine nozzles 35 are in their forward position. This provides a thrust aft to counterbalance the forward thrust of the main propulsion engine necessary for pitch control. The remaining fine balance is provided by the pilot by manual control of the aircraft pitch attitude.

Next, the vertical flight control lever in the cockpit is raised to command the desired rate of ascent. During ascent, attitude stability may be provided by the automatic stabilizing system. Upon reaching the desired altitude, the vertical control lever is set at neutral or at an altitude hold position. Through the servo, then it will cause the lift engines 25 to be throttled so that a constant altitude is maintained through the acceleration flight regime.

The horizontal acceleration to conventional flight speed is then initiated by moving the lift engine nozzles 35 to the aft position. When the pilot increases the thrust of the main engine to a full power by use of a separate throttle control, the gear is raised and the pitch control vanes 41 are retracted from the exhaust when sufficient forward speed is attained so that the elevators are operative.

The horizontal acceleration is accomplished at a low angle of attack to minimize aerodynamic drag and maximize accelerating thrust. Upon exceeding minimum conventional flight speed, the airplane is rotated to an angle of attack sufficient to permit the wings 14 to support the airplane's weight. At the same time, lift engines 25 are shut down and the pod doors 20 through 23 closed. The pitch control vanes 41 probably can be retracted before this point since the elevator reaches adequate effectiveness below minimum conventional flight speed.

In the vicinity of the landing area, the airplane is decelerated normally at a relatively low altitude with takeoff flaps extended and the main engine thrust as required to maintain level flight. In this flight condition, the pod doors 20 through 23 are opened and the lift engines 25 started and set at idle thrust. The pilot adjusts the throttle of the main engine if necessary to a setting sufficient for adequate operation of the pitch control vanes 41 and extends the vanes 41 into the engine's exhaust. Next the pilot uses the vertical control lever to increase the thrust of all lift engines 25 from idle thrust to a thrust corresponding to the desired vertical velocity. All lift engine nozzles 35 are then swivelled to the most forward position to aid in deceleration. At this point the landing gear and speed brakes, if any, are extended. The distance required to decelerate the aircraft to a hovering position can be accomplished by in-flight operation of a thrust reverser on the main engine. The landing transition is flown at a low angle of attack in order to maintain pilot vision in normal aircraft ground clearance relationships. It is anticipated that pitch attitude may be controlled manually by the pilot but automatic control may be utilized if necessary.

Having decelerated satisfactorily, descent to touchdown is initiated with the vertical control lever with which specific rates of descent are established. During descent, positioning over the landing pad is accomplished by manual pilot action through his control about the three basic axes.

In areas where vertical takeoff is not absolutely necessary or where the aircraft is to be loaded at loads over that which it can handle on vertical operation, short takeoff operations are necessary. Aircraft gross weights which exceed the vertical takeoff capability may be lifted into the air by employing a short takeoff run of only a few hundred feet with liftoff speeds well below conventional takeoff speeds. This capability is achieved by use of the vertical lift engines 25 which effectively reduces wing loading to very low values. The short takeoff is made by using the horizontal takeoff position transition configuration which is represented by throttling the main engine to full thrust with the vertical control lever set at maximum vertical velocity and the lift engine nozzles 35 in the aft or accelerate position. Following liftoff the transition to aerodynamic flight is very similar to that following vertical liftoff.

An aircraft has been disclosed which is capable of conventional or normal flight between vertical or short takeoff and vertical landing. Having disclosed its details, I claim the following combination of elements and their equivalents as my invention.

1. An aircraft adapted for vertical takeoff and landing having a fuselage, wings and empennage, a jet engine in the fuselage, an exhaust at the aft end of the aircraft, a pod on each wing-tip, each pod containing a plurality of vertically oriented lift engines along its length, door means on the upper and lower surfaces of the pods, means to open the doors for operation of the lift engines in the pods, means to close the doors to provide a smooth aerodynamic shape, nozzle means on the exhaust end or lower end of each lift engine, means to rotate the nozzle means about a lateral axis from a forward position through neutral to an aft position, horizontal aerodynamic vanes having their axes parallel to the exhaust of the main engine adjacent to the outlet of the exhaust, means to pivot the vanes into the exhaust stream so that their axes lie perpendicularly to the axis of the main engine, means to pivot the vanes about their axes to provide pitch control for the aircraft at zero forward velocity with the main engine operating means to connect the control for the vanes to the aircraft horizontal elevator controls.

2. An aircraft having a fuselage, wings and empennage, a jet engine in the fuselage having its exhaust in the aft end of the aircraft, a vane in the exhaust pivoted on a horizontal axis, means connecting the vane to the control stick in the cockpit of the aircraft so that fore and aft movement of the control stick will cause the vane in the exhaust to move about its axis to lend pitch control to the aircraft when the engine is operating, a pod on each wing-tip, vertically oriented lift engines in each pod, door means on the upper surfaces of the pod over the lift engines, means to open the door means on the upper surfaces so that they form a bell-mouth inlet to the lift engines, door means on the lower surfaces of the pods, means to open the lower door means so that they are spaced from the pod so that secondary air is drawn between the pod and the lower door means by the exhaust of the lift engines for thrust augmentation, throttle means in the cockpit of the aircraft so as to control the thrust of the lift engines in each pod.

3. An aircraft having a fuselage, wings and empennage, a jet engine in the fuselage having its exhaust in the aft end of the aircraft, horizontal vane means in the exhaust on an axis perpendicular to the axis of the jet engine, means connecting the vane means to the pilot's control stick so that fore and aft movement of the control stick will cause the vane means to pivot about their axes in the exhaust of the jet engine for pitch control, pods on the wing-tips of the aircraft, vertically oriented lift engines in the pods, and control means in the cockpit of the airplane for the throttles of the lift engines in the wing-tip pods.

4. A vertical takeoff and landing aircraft comprising a fuselage, wings, empennage, a control stick, a rearward exhausting jet engine, a pod on each wing-tip, each pod containing a plurality of vetrically oriented lift engines along its length, door means on upper and lower surfaces of said pods blending aerodynamically with said pods, means to open and close said doors, rotatable nozzle means attached to the exhaust of each said lift engine, means for rotating said nozzles forward and rearward, horizontal aerodynamic vanes stowed in a non-rotatable manner adjacent to and having their axes approximately parallel to the exhaust of said jet engine, means to connect said vanes to said control stick to pivot said vanes into the exhaust stream so that the vane axes lie perpendicular to the axis of the main engine, and means to pivot the vanes about their axes to provide pitch control for the aircraft at zero forward velocity with the jet engine operating.

References Cited in the file of this patent

UNITED STATES PATENTS 2,780,424    Price _____ Feb. 5, 1957